United States Patent
Lee et al.

(10) Patent No.: US 10,916,240 B2
(45) Date of Patent: Feb. 9, 2021

(54) MOBILE TERMINAL AND METHOD OF OPERATING THE SAME

(71) Applicant: LG ELECTRONICS INC., Seoul (KR)

(72) Inventors: Jeehye Lee, Seoul (KR); Hwansik Yun, Seoul (KR); Eugene Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 97 days.

(21) Appl. No.: 16/401,726

(22) Filed: May 2, 2019

(65) Prior Publication Data

US 2020/0202844 A1 Jun. 25, 2020

(30) Foreign Application Priority Data

Dec. 19, 2018 (KR) .......................... 10-2018-0165332

(51) Int. Cl.
  *G10L 15/14* (2006.01)
  *G10L 15/06* (2013.01)
  *G06N 3/08* (2006.01)
  *G10L 15/16* (2006.01)

(52) U.S. Cl.
  CPC ............ *G10L 15/144* (2013.01); *G06N 3/088* (2013.01); *G10L 15/063* (2013.01); *G10L 15/16* (2013.01); *G10L 2015/0631* (2013.01)

(58) Field of Classification Search
  None
  See application file for complete search history.

(56) References Cited

U.S. PATENT DOCUMENTS

| | | | |
|---|---|---|---|
| 8,024,190 B2 * | 9/2011 | Hakkani-Tur | G10L 15/063 704/252 |
| 9,697,822 B1 * | 7/2017 | Naik | G10L 15/22 |
| 2010/0169093 A1 | 7/2010 | Washio | |
| 2011/0307422 A1 * | 12/2011 | Drucker | G06N 20/00 706/12 |
| 2012/0209587 A1 * | 8/2012 | Tanaka | G06F 40/42 704/2 |
| 2012/0323573 A1 | 12/2012 | Yoon et al. | |
| 2018/0151177 A1 | 5/2018 | Gemmeke et al. | |

FOREIGN PATENT DOCUMENTS

| | | |
|---|---|---|
| KR | 1020140035164 | 3/2014 |
| KR | 1020170086233 | 7/2017 |
| WO | 2016188593 | 12/2016 |

OTHER PUBLICATIONS

PCT International Application No. PCT/KR2019/009086, Written Opinion of the International Searching Authority dated Oct. 28, 2019, 8 pages.

* cited by examiner

*Primary Examiner* — Nafiz E Hoque
(74) *Attorney, Agent, or Firm* — Lee Hong Degerman Kang & Waimey

(57) ABSTRACT

A terminal includes a memory configured to store voice data and a processor configured to measure reliability of learnable data stored in the memory, to classify the learnable data into learning data or adaptive data according to the measured reliability, to generate a learning model by performing unsupervised learning with respect to the learning data, to generate an adaptive model using the adaptive data, and to evaluate recognition performance of each of the learning model and the adaptive model.

13 Claims, 8 Drawing Sheets

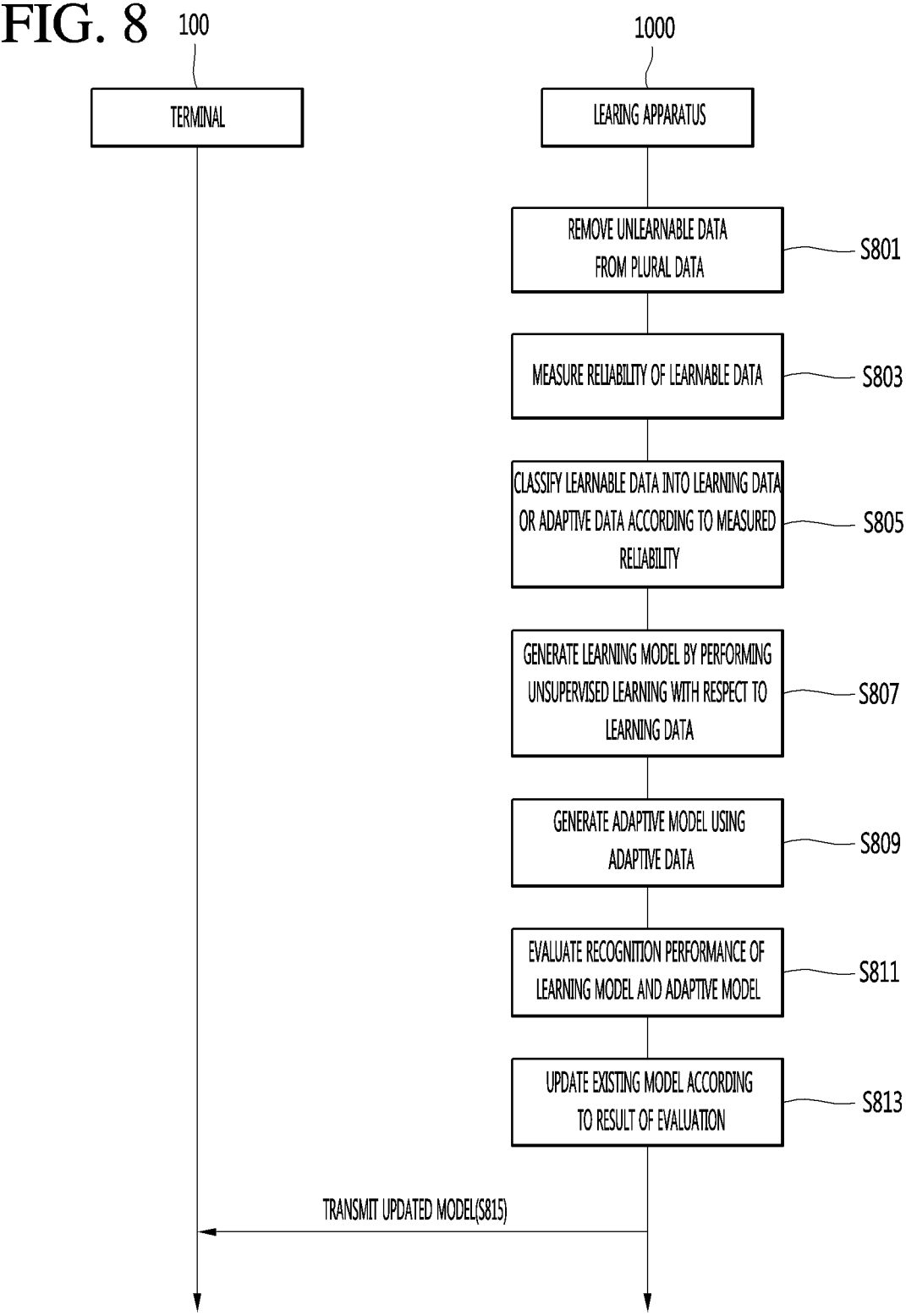

MOBILE TERMINAL AND METHOD OF OPERATING THE SAME

CROSS-REFERENCE TO RELATED APPLICATIONS

Pursuant to 35 U.S.C. § 119(a), this application claims the benefit of earlier filing date and right of priority to Korean Application No. 10-2018-0165332, filed on Dec. 19, 2018, the contents of which are hereby incorporated by reference herein in its entirety.

FIELD

The present invention relates to a terminal capable of improving voice recognition performance.

BACKGROUND

As performance of mobile devices has been improved, voice recognizers have increasingly become widespread in an embedded system.

Since voice recognizers deal with many vocabularies and many parameters of acoustic models, techniques for reducing the computational cost of a recognition process have been studied.

In general, recognition performance of the voice recognizer varies according to surroundings and speakers. A conventional active learning method requires a manual transcription process of voice data, which consumes a lot of time and cost.

In addition, a learning time rapidly increases by using unselective data.

In addition, if only one of a learning method or an adaptive method is used, improvement in voice recognition performance in an actual environment is limited.

In addition, in order to evaluate performance of a generated model, a person needs to directly configure a test set.

The patent related thereto includes U.S. Pat. No. 8,024,190. In U.S. Pat. No. 8,024,190, a manual transcription process is used in a process of transcribing sampled voice data, and a person directly evaluates voice recognition performance if voice recognition performance of a learning model is evaluated, which consumes a lot of time and cost.

SUMMARY

An object of the present invention is to improve voice recognition performance by learning data of an actual use environment according to voice recognition models for voice recognition.

Another object of the present invention is to automatically generate an acoustic model at predetermined intervals without human intervention and to verify performance of the generated acoustic model.

A terminal according to an embodiment of the present invention may classify learnable data according to reliability, generate a learning model and an adaptive model using unsupervised learning, measure performance evaluation values of the generated learning model and the adaptive model, and determine whether an existing acoustic model is updated.

BRIEF DESCRIPTION OF THE DRAWINGS

FIG. 8 is a ladder diagram illustrating a method of operating a voice recognition system according to an embodiment of the present invention.

DETAILED DESCRIPTION OF THE EMBODIMENTS

Figure 1:
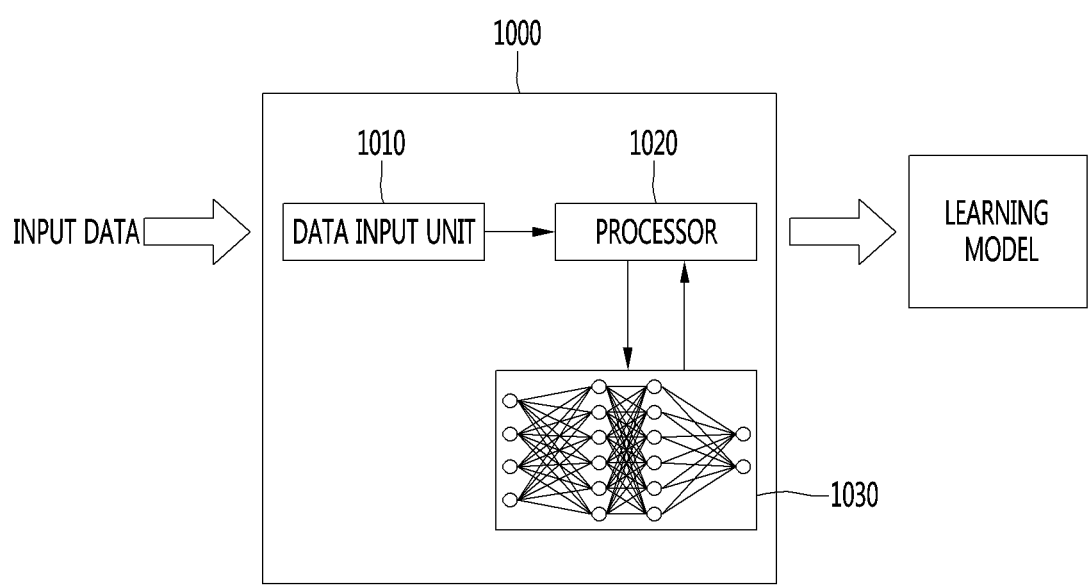
FIG. 1 is a block diagram illustrating a learning apparatus of an artificial neural network.

Exemplary embodiments of the present invention will be described below in detail with reference to the accompanying drawings in which the same reference numbers are used throughout this specification to refer to the same or like parts and a repeated description thereof will be omitted. The suffixes "module" and "unit" of elements herein are used for convenience of description and thus can be used interchangeably and do not have any distinguishable meanings or functions. In describing the present invention, a detailed description of known functions and configurations will be omitted if it may obscure the subject matter of the present invention. The accompanying drawings are used to help easily understood the technical idea of the present invention and it should be understood that the idea of the present invention is not limited by the accompanying drawings. The idea of the present invention should be construed to extend to any alterations, equivalents and substitutions besides the accompanying drawings.

It will be understood that, although the terms first, second, etc. may be used herein to describe various elements of the present invention, these terms are only used to distinguish one element from another element and essential, order, or sequence of corresponding elements are not limited by these terms.

It will be understood that if one element is referred to as being "connected to" or "coupled to" another element, one element may be "connected to" or "coupled to", another element via a further element although one element may be directly connected to or directly accessed to another element.

Artificial intelligence (AI) is a field of computer engineering and information technology involving studying how computers can think, learn and self-develop in ways similar to human intelligence, and means that computers can emulate intelligent actions of humans.

In addition, artificial intelligence does not exist by itself but is directly or indirectly associated with the other fields of computer science. In particular, many attempts have been made to introduce elements of artificial intelligence into various fields of information technology.

Machine learning is a field of artificial intelligence, which gives a computer the ability to learn without explicit programming.

Specifically, machine learning refers to a system for performing learning based on empirical data, performing prediction and improving performance thereof and technology for studying and building the same. Machine learning does not perform strictly defined static program commands, but rather builds a specific model to make a prediction or decision based on input data.

The term machine learning may be used interchangeably with the term machine learning.

Many machine learning algorithms have been developed based on how to classify data in machine learning. Representative examples thereof include a decision tree, a Bayesian network, a support vector machine (SVM) and an artificial neural network.

The decision tree refers to an analysis method of performing classification and prediction by plotting decision rules in a tree structure.

The Bayesian network is a model for representing conditional independence between multiple variables in a graph structure. The Bayesian network is suitable for data mining through unsupervised learning.

The SVM is a model of supervised learning for pattern recognition and data analysis and is mainly used for classification and regression analysis.

The artificial neural network (ANN) is a model of a connection relationship between neurons and the operation principle of biological neurons and is an information processing system in which a plurality of neurons such as nodes or processing elements are connected in the form of layers.

The artificial neural network (ANN) is a model used for machine learning and is a statistical learning algorithm inspired by biological neural networks (especially, in animals).

Specifically, the ANN may mean a model having a problem solution ability by changing the strength of connection through learning at nodes.

The term artificial neural network (ANN) may be used interchangeably with the term neural network.

The ANN may include a plurality of layers and each layer may include a plurality of neurons. In addition, the ANN may include synapses connecting neurons.

The ANN may be generally defined by the following three factors: (1) a connection pattern between neurons of different layers, (2) a learning process of updating the weight of a connection, and (3) an activation function for generating an output value by a weighted sum of input received from a previous layer.

The ANN may include various network models such as a deep neural network (DNN), a recurrent neural network (RNN), a bidirectional recurrent deep neural network (BRDNN), a multilayer perceptron (MLP), and a convolutional neural network (CNN), without being limited thereto.

In this specification, the term layer may be used interchangeably with the term layer.

The ANN may be classified into single-layer neural networks and multilayer neural networks according to the number of layers.

A general single-layer neural network includes an input layer and an output layer.

In addition, a general multilayer neural network includes an input layer, a hidden layer and an output layer.

The input layer receives external data, and the number of neurons of the input layer is equal to the number of input variables. The hidden layer is located between the input layer and the output layer. The hidden layer receives a signal from the input layer, and extracts and transmits characteristics to the output layer. The output layer receives a signal from the hidden layer and outputs the signal to the outside.

The input signals of neurons are multiplied by respective strengths of connection having values between 0 and 1 and then are summed. If this sum is greater than a threshold value of the neuron, the neuron is activated and an output value is obtained through an activation function.

Meanwhile, a deep neural network (DNN) including a plurality of hidden layers between an input layer and an output layer may be a representative artificial neural network for implementing deep learning which is machine learning technology.

Meanwhile, the term deep learning may be used interchangeably with the term deep learning.

The ANN may be trained using training data. Here, training may mean a process of determining parameters of the ANN using training data for the purpose of classifying, regressing or clustering input data. The representative examples of the parameters of the ANN include a weight applied to a synapse and a bias applied to a neuron.

The ANN trained using the training data may classify or cluster input data according to the pattern of the input data.

Meanwhile, the ANN trained using the training data may be referred to as a learning model in this specification.

Next, a learning method of the ANN will be described.

The learning method of the ANN may be roughly classified into supervised learning, unsupervised learning, semi-supervised learning, and reinforcement learning.

The supervised learning is a method of deriving one function from training data.

Among the derived functions, outputting consecutive values may be referred to as regression and predicting and outputting the class of an input vector may be referred to as classification.

In the supervised learning, the ANN is trained in a state in which training data is labeled.

Here, the label may mean a correct answer (or a result value) inferred by an ANN if training data is input to the ANN.

In this specification, the correct answer (or the result value) inferred by the ANN if training data is input is referred to as a label or labeling data.

In this specification, labeling training data for training the ANN is referred to as labeling training data with labeling data.

In this case, training data and a label corresponding to the training data configure one training set, and the training set may be input to the ANN.

Meanwhile, the training data represents a plurality of features and labeling the training data may mean labeling the feature represented by the training data. In this case, the training data may represent the feature of an input object in the form of a vector.

The ANN may derive a function of an association between training data and labeling data using the training data and the labeling data. In addition, the ANN may determine (optimize) the parameter of the ANN through evaluation of the derived function.

In the unsupervised learning, training data is not labeled.

Specifically, the unsupervised learning may be a method of training the ANN to find and classify a pattern in the training data itself rather than the association between the training data and the label corresponding to the training data.

Examples of the unsupervised learning may include clustering and independent component analysis.

In this specification, the term clustering may be used interchangeably with the term clustering.

Examples of an ANN using unsupervised learning may include a generative adversarial network (GAN) and an autoencoder (AE).

The GAN refers to a machine learning method of improving performance through competition between two different artificial intelligence models, that is, a generator and a discriminator.

In this case, the generator is a model for generating new data and may generate new data based on original data.

In addition, the discriminator is a model for discriminating the pattern of data and may discriminate authenticity of the new data generated by the generator based on the original data.

The generator may receive and learn data which does not deceive the discriminator, and the discriminator may receive and learn deceiving data from the generator. Accordingly, the generator may evolve to maximally deceive the discriminator and to distinguish between the original data of the discriminator and the data generated by the generator.

The autoencoder (AE) is a neural network which aims to reproduce input itself as output.

The AE includes an input layer, a hidden layer and an output layer. Input data is input to the hidden layer through the input layer.

In this case, since the number of nodes of the hidden layer is less than the number of nodes of the input layer, the dimension of data is reduced and thus compression or encoding is performed.

Meanwhile, the AE controls the strength of connection of the neuron through learning, such that input data is represented by hidden-layer data. In the hidden layer, information is represented by a smaller number of neurons than the input layer, and reproducing input data as output may mean that the hidden layer finds a hidden pattern from the input data and expresses the hidden pattern.

The semi-supervised learning may refer to a learning method of using both labeled training data and unlabeled training data.

As one of the semi-supervised learning technique, there is a technique for inferring the label of unlabeled training data and then performing learning using the inferred label. This technique is useful if labeling cost is high.

Reinforcement learning is a theory that an agent can find the best way through experience without data if an environment in which the agent may decide what action is taken every moment is given.

Reinforcement learning may be performed by a Markov decision process (MDP).

The Markov Decision Process (MDP) will be briefly described. First, an environment including information necessary for the agent to take a next action is given. Second, what action is taken by the agent in that environment is defined. Third, a reward given to the agent if the agent successfully takes a certain action and a penalty given to the agent if the agent fails to take a certain action are defined. Fourth, experience is repeated until a future reward reaches a maximum point, thereby deriving an optimal action policy.

FIG. 1 is a block diagram illustrating a learning apparatus 1000 of an artificial neural network.

The learning apparatus 1000 of the artificial neural network may include a data input unit 1010, a processor 1020 and an artificial neural network 1030.

The data input unit 1010 may receive input data. In this case, the data input unit 1010 may receive training data or unprocessed data.

If the data input unit 1010 receives unprocessed data, the processor 1020 may preprocess the received data and generate training data capable of being input to the artificial neural network 1030.

The artificial neural network 1030 may be implemented in hardware, software or a combination thereof. If a portion or whole of the artificial neural network 1030 is implemented in software, one or more commands configuring the artificial neural network 1030 may be stored in a memory (not shown) included in the learning apparatus 1000 of the artificial neural network.

The processor 1020 may input training data or a training set to the artificial neural network 1030 to train the artificial neural network 1030.

Specifically, the processor 1020 may repeatedly train the artificial neural network (ANN) using various learning methods, thereby determining (optimizing) parameters of the artificial neural network (ANN).

The artificial neural network having the parameters determined by learning using the training data may be referred to as a learning model.

Meanwhile, the learning model may be used to infer a result value for new input data instead of the training data.

Meanwhile, the learning model may infer the result value in a state of being installed in the learning apparatus 1000 of the artificial neural network and may be transmitted to and installed in another device.

If the learning model is transmitted to another device, the learning apparatus 1000 of the artificial neural network may include a communication unit (not shown) for communication with another device.

Figure 2:
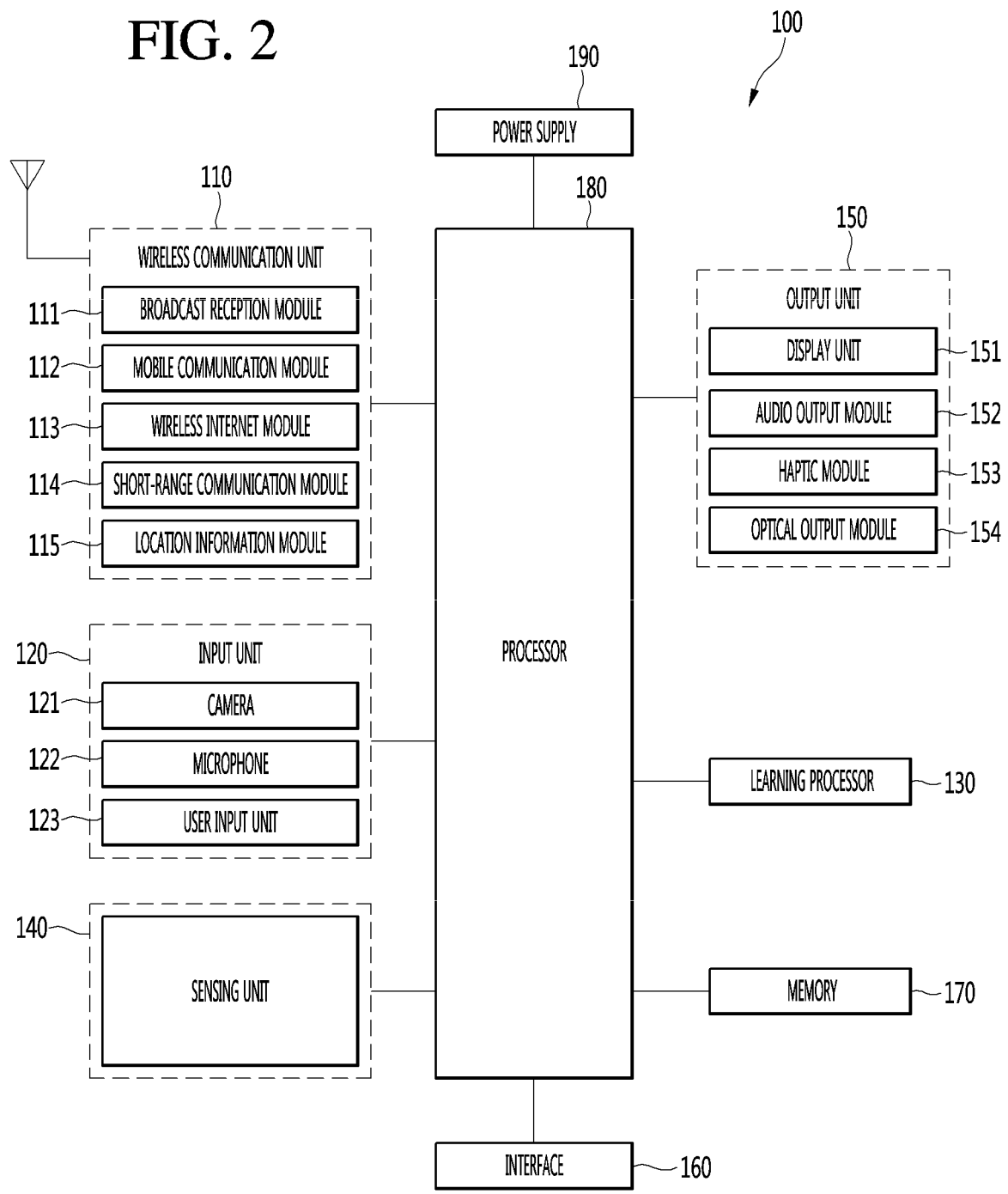
FIG. 2 is a block diagram illustrating the configuration of a terminal according to an embodiment of the present invention.

A terminal 100 which may be used as another device will be described with reference to FIG. 2.

The terminal described in this specification may include cellular phones, smart phones, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

However, the terminal 100 according to the embodiment is applicable to stationary terminals such as smart TVs, desktop computers or digital signages.

In addition, the terminal 100 according to the embodiment of the present invention is applicable to stationary or mobile robots.

In addition, the terminal 100 according to the embodiment of the present invention may perform the function of a voice agent. The voice agent may be a program for recognizing the voice of a user and audibly outputting a response suitable to the recognized voice of the user.

The terminal 100 may include a wireless communication unit 110, an input unit 120, a learning processor 130, a sensing unit 140, an output unit 150, an interface 160, a memory 170, a processor 180 and a power supply 190.

The learning model may be installed in the terminal 100.

Meanwhile, the learning model may be implemented in hardware, software or a combination thereof. If a portion or whole of the learning model is implemented in software, one or more commands configuring the learning model may be stored in the memory 170.

The wireless communication unit 110 may include at least one of a broadcast reception module 111, a mobile communication module 112, a wireless Internet module 113, a short-range communication module 114 and a location information module 115.

The broadcast reception module 111 receives broadcast signals and/or broadcast associated information from an external broadcast management server through a broadcast channel.

The mobile communication module 112 can transmit and/or receive wireless signals to and from at least one of a base station, an external terminal, a server, and the like over a mobile communication network established according to technical standards or communication methods for mobile communication (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless Internet module 113 is configured to facilitate wireless Internet access. This module may be installed inside or outside the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like.

The short-range communication module 114 is configured to facilitate short-range communication and to support short-range communication using at least one of Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The location information module 115 is generally configured to acquire the position (or the current position) of the mobile terminal. Representative examples thereof include a Global Position System (GPS) module or a Wi-Fi module. As one example, if the mobile terminal uses a GPS module, the position of the mobile terminal may be acquired using a signal sent from a GPS satellite.

The input unit 120 may include a camera 121 for receiving a video signal, a microphone 122 for receiving an audio signal, and a user input unit 123 for receiving information from a user.

Voice data or image data collected by the input unit 120 may be analyzed and processed as a control command of the user.

The input unit 120 may receive video information (or signal), audio information (or signal), data or user input information. For reception of video information, the mobile terminal 100 may include one or a plurality of cameras 121.

The camera 121 may process image frames of still images or moving images obtained by image sensors in a video call more or an image capture mode. The processed image frames can be displayed on the display 151 or stored in memory 170.

The microphone 122 processes an external acoustic signal into electrical audio data. The processed audio data may be variously used according to function (application program) executed in the mobile terminal 100. If desired, the microphone 122 may include various noise removal algorithms to remove noise generated in the process of receiving the external acoustic signal.

The user input unit 123 receives information from a user. If information is received through the user input unit 123, the processor 180 may control operation of the terminal 100 in correspondence with the input information.

The user input unit 123 may include one or more of a mechanical input element (for example, a mechanical key, a button located on a front and/or rear surface or a side surface of the mobile terminal 100, a dome switch, a jog wheel, a jog switch, and the like) or a touch input element. As one example, the touch input element may be a virtual key, a soft key or a visual key, which is displayed on a touchscreen through software processing, or a touch key located at a location other than the touchscreen.

The learning processor 130 may be configured to receive, classify, store and output information to be used for data mining, data analysis, intelligent decision, mechanical learning algorithms and techniques.

The learning processor 130 may include one or more memory units configured to store data received, detected, sensed, generated or output in a predetermined manner or another manner by the terminal or received, detected, sensed, generated or output in a predetermined manner or another manner by another component, device, terminal or device for communicating with the terminal.

The learning processor 130 may include a memory integrated with or implemented in the terminal. In some embodiment, the learning processor 130 may be implemented using the memory 170.

Selectively or additionally, the learning processor 130 may be implemented using a memory related to the terminal, such as an external memory directly coupled to the terminal or a memory maintained in a server communicating with the terminal.

In another embodiment, the learning processor 130 may be implemented using a memory maintained in a cloud computing environment or another remote memory accessible by the terminal through the same communication scheme as a network.

The learning processor 130 may be configured to store data in one or more databases in order to identify, index, categorize, manipulate, store, retrieve and output data to be used for supervised or unsupervised learning, data mining, predictive analysis or other machines.

Information stored in the learning processor 130 may be used by one or more other controllers of the terminal or the processor 180 using any one of different types data analysis algorithms and machine learning algorithms.

Examples of such algorithms include k-nearest neighbor systems, fuzzy logic (e.g., possibility theory), neural networks, Boltzmann machines, vector quantization, pulse neural networks, support vector machines, maximum margin classifiers, hill climbing, inductive logic system Bayesian networks, Petri Nets (e.g., finite state machines, Mealy machines or Moore finite state machines), classifier trees (e.g., perceptron trees, support vector trees, Marcov trees, decision tree forests, random forests), betting models and systems, artificial fusion, sensor fusion, image fusion, reinforcement learning, augmented reality, pattern recognition, and automated planning.

The processor 180 may make a decision using data analysis and machine learning algorithms and determine or predict at least one executable operation of the terminal based on the generated information. To this end, the processor 180 may request, retrieve, receive or use the data of the processor 130 and control the terminal to execute preferable operation or predicted operation of at least executable operation.

The processor 180 may perform various functions for implementing intelligent emulation (that is, a knowledge based system, an inference system and a knowledge acquisition system). This is applicable to various types of systems (e.g., a fussy logic system) including an adaptive system, a machine learning system, an artificial neural system, etc.

The processor 180 may include a sub module enabling operation involving speech and natural language speech processing, such as an I/O processing module, an environmental condition module, speech-to-text (STT) processing module, a natural language processing module, a workflow processing module and a service processing module.

Each of such sub modules may have an access to one or more systems or data and models at the terminal or a subset or superset thereof. In addition, each of the sub modules may provide various functions including vocabulary index, user data, a workflow model, a service model and an automatic speech recognition (ASR) system.

In another embodiment, the other aspects of the processor 180 or the terminal may be implemented through the above-described sub modules, systems or data and models.

In some embodiments, based on the data of the learning processor 130, the processor 180 may be configured to detect and sense requirements based on the context condition or user's intention expressed in user input or natural language input.

The processor 180 may actively derive and acquire information necessary to fully determine the requirements based on the context condition or user's intention. For example, the processor 180 may actively derive information necessary to determine the requirements, by analyzing historical data including historical input and output, pattern matching, unambiguous words, and input intention, etc.

The processor 180 may determine a task flow for executing a function for responding to the requirements based on the context condition or the user's intention.

The processor 180 may be configured to collect, sense, extract, detect and/or receive signals or data used for data analysis and machine learning operations through one or more sensing components at the terminal, in order to collect information for processing and storage from the learning processor 130.

Information collection may include sensing information through a sensor, extracting information stored in the memory 170, or receiving information from another terminal, an entity or an external storage device through a communication unit.

The processor 180 may collect and store usage history information from the terminal.

The processor 180 may determine the best match for executing a specific function using the stored usage history information and predictive modeling.

The processor 180 may receive or sense surrounding information or other information through the sensing unit 140.

The processor 180 may receive broadcast signals and/or broadcast related information, wireless signals or wireless data through the wireless communication unit 110.

The processor 180 may receive information (or signals corresponding thereto), audio signal (or signals corresponding thereto), data or user input information from the input unit 120.

The processor 180 may collect information in real time, process or classify the information (e.g., a knowledge graph, a command policy, a personalization database, a dialog engine, etc.), and store the processed information in the memory 170 or the learning processor 130.

If the operation of the terminal is determined based on data analysis and machine learning algorithms and techniques, the processor 180 may control the components of the terminal in order to execute the determined operation. The processor 180 may control the terminal according to a control command and perform the determined operation.

If the specific operation is performed, the processor 180 may analyze historical information indicating execution of the specific operation through data analysis and machine learning algorithms and techniques and update previously learned information based on the analyzed information.

Accordingly, the processor 180 may improve accuracy of future performance of data analysis and machine learning algorithms and techniques based on the updated information, along with the learning processor 130.

The sensing unit 140 may include one or more sensors configured to sense internal information of the mobile terminal, the surrounding environment of the mobile terminal, user information, and the like.

For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a fingerprint (finger scan) sensor, an ultrasonic sensor, an optical sensor (for example, a camera 121), a microphone 122, a battery gauge, an environment sensor (for example, a barometer, a hygrometer, a thermometer, a radiation detection sensor, a thermal sensor, and a gas sensor), and a chemical sensor (for example, an electronic nose, a health care sensor, a biometric sensor, and the like). The mobile terminal disclosed in this specification may be configured to combine and utilize information obtained from at least two sensors of such sensors.

The output unit 150 is typically configured to output various types of information, such as audio, video, tactile output, and the like. The output unit 150 may include a display 151, an audio output module 152, a haptic module 153, and an optical output module 154.

The display 151 is generally configured to display (output) information processed in the mobile terminal 100. For example, the display 151 may display execution screen information of an application program executed by the mobile terminal 100 or user interface (UI) and graphical user interface (GUI) information according to the executed screen information.

The display 151 may have an inter-layered structure or an integrated structure with a touch sensor in order to realize a touchscreen. The touchscreen may provide an output interface between the mobile terminal 100 and a user, as well as function as the user input unit 123 which provides an input interface between the mobile terminal 100 and the user.

The audio output module 152 is generally configured to output audio data received from the wireless communication unit 110 or stored in the memory 170 in a call signal reception mode, a call mode, a record mode, a voice recognition mode, a broadcast reception mode, and the like. The audio output module 152 may also include a receiver, a speaker, a buzzer, or the like.

A haptic module 153 can be configured to generate various tactile effects that a user feels. A typical example of a tactile effect generated by the haptic module 153 is vibration.

An optical output module 154 can output a signal for indicating event generation using light of a light source of the mobile terminal 100. Examples of events generated in the mobile terminal 100 may include message reception, call signal reception, a missed call, an alarm, a schedule notice, email reception, information reception through an application, and the like.

The interface 160 serves as an interface with external devices to be connected with the mobile terminal 100. The interface 160 may include wired or wireless headset ports, external power supply ports, wired or wireless data ports, memory card ports, ports for connecting a device having an identification module, audio input/output (I/O) ports, video I/O ports, earphone ports, or the like. The terminal 100 may perform appropriate control related to the connected external device in correspondence with connection of the external device to the interface 160.

The identification module may be a chip that stores a variety of information for granting use authority of the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the first interface 160.

The memory 170 stores data supporting various functions of the terminal 100.

The memory 170 may store a plurality of application programs or applications executed in the terminal 100, data and commands for operation of the terminal 100, and data for operation of the learning processor 130 (e.g., at least one piece of algorithm information for machine learning).

The processor 180 generally controls overall operation of the terminal 100, in addition to operation related to the application program. The processor 180 may process signals, data, information, etc. input or output through the above-described components or execute the application program stored in the memory 170, thereby processing or providing appropriate information or functions to the user.

In addition, the processor 180 may control at least some of the components described with reference to FIG. 1 in order to execute the application program stored in the memory 170. Further, the processor 180 may operate a combination of at least two of the components included in the terminal, in order to execute the application program.

The power supply 190 receives external power or internal power and supplies the appropriate power required to operate respective components included in the mobile terminal 100, under control of the controller 180. The power supply 190 may include a battery, which is typically rechargeable or be detachably coupled to the terminal body for charging.

Meanwhile, as described above, the processor 180 controls operation related to the application program and overall operation of the terminal 100. For example, the processor 180 may execute or release a lock function for limiting input of a control command of the user to applications if the state of the mobile terminal satisfies a set condition.

Figure 3:
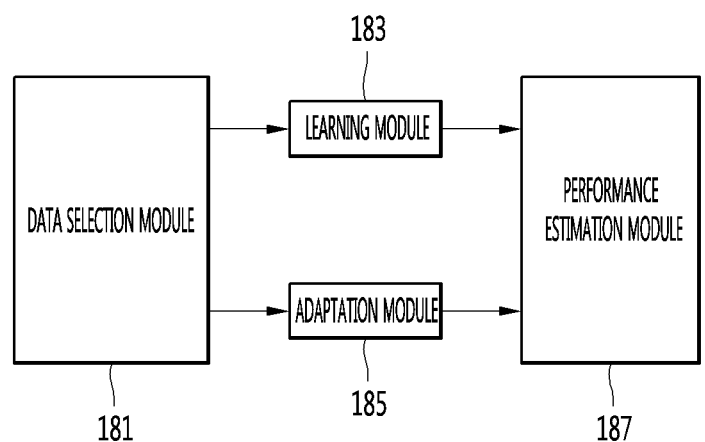
FIG. 3 is a diagram illustrating the detailed configuration of a processor according to an embodiment of the present invention.

FIG. 3 is a diagram illustrating the detailed configuration of a processor according to an embodiment of the present invention.

Referring to FIG. 3, the processor 180 according to the embodiment of the present invention may include a data selection module 181, a learning module 183, an adaptation module 185 and a performance estimation module 187.

The data selection module 181 may remove unlearnable data from a plurality of data.

The data selection module 181 may measure reliability of remaining learnable data after removing unlearnable data.

The data selection module 181 may classify learnable data into learning data or adaptive data according to the measured reliability.

The learning module 183 may perform unsupervised learning with respect to the classified learning data, thereby generating a learning model.

The adaptation module 185 may generate an adaptive model using the classified adaptive data.

The adaptation module 185 may generate an adaptive model, by modeling a probability distribution of the adaptive data using a machine learning algorithm capable of unsupervised learning, such as a generative adversarial network.

The performance estimation module 187 may evaluate voice recognition performance of the generated learning model and adaptive model.

The elements configuring the processor 180 will be described in detail below.

The elements shown in FIG. 3 may be included in the processor 1020 of the learning apparatus 1000 described in FIG. 1.

Figure 4:
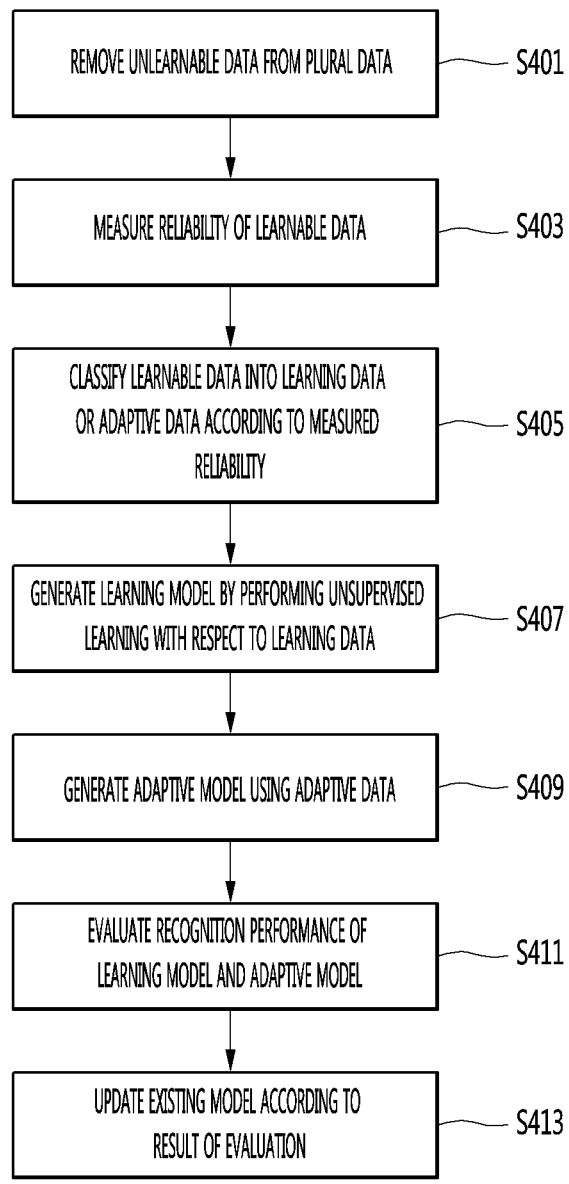
FIG. 4 is a flowchart illustrating a method of operating a terminal according to an embodiment of the present invention.

In this case, the embodiment of FIG. 4 may be implemented by the processor 1020 of the learning apparatus 1000.

FIG. 4 is a flowchart illustrating a method of operating a terminal according to an embodiment of the present invention.

The data selection module 181 of the processor 180 removes unlearnable data from a plurality of data (S401).

In one embodiment, the data selection module 181 may receive the plurality of data from a voice recognition server. The voice recognition server may be a natural language processing (NLP) server for performing intent analysis.

In another embodiment, the data selection module 181 may acquire the plurality of data from the memory 170.

The data selection module 181 may remove non-voice data, multi-speaker voice data and misrecognized voice data from the plurality of data.

The data selection module 181 may distinguish between non-voice data and multi-speaker voice data using the power spectrum of each of the plurality of data.

The data selection module 181 may classify data into the non-voice data, if the frequency band of the data is out of the frequency band of speaker's voice.

The data selection module 181 may classify data into the multi-speaker voice data, if the number of frequency bands of the data is a predetermined number or more.

The data selection module 181 of the processor 180 measures reliability of remaining learnable data (S403), after removing the unlearnable data.

In one embodiment, the data selection module 181 may measure the reliability of the learnable data based on the reliability score measurement method of the known paper <Recognition Confidence Scoring for Use in Speech Understanding Systems>.

The data selection module 181 of the processor 180 classifies learnable data into learning data or adaptive data according to the measured reliability (S405).

The data selection module 181 may classify the data into the learning data, if the measured reliability is equal to or greater than reference reliability.

The learning data may be used to generate a new learning model.

The data selection module 181 may classify the data into the adaptive data, if the measured reliability is less than the reference reliability.

The adaptive data may be used to generate the adaptive model.

The learning module 183 of the processor 180 performs unsupervised learning with respect to the classified learning data, thereby generating a learning model (S407).

A process of generating a learning model will be described with reference to FIG. 5.

Figure 5:
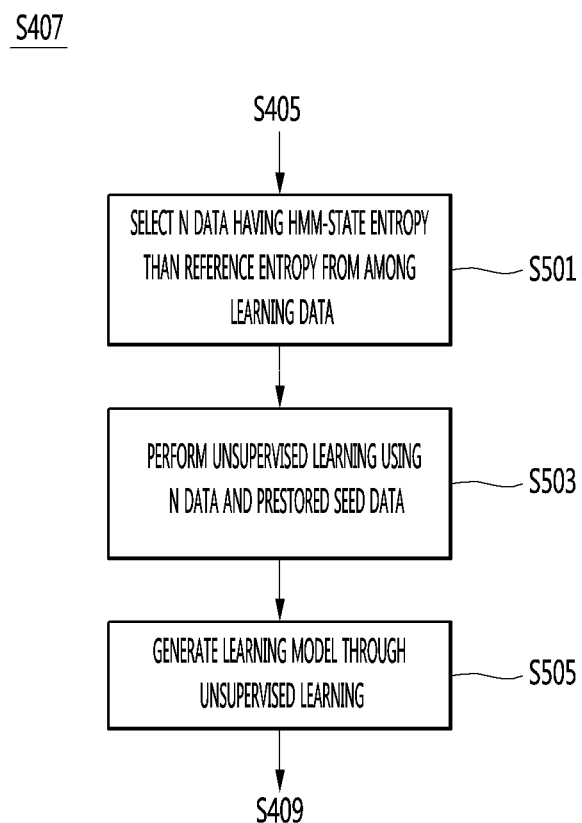
FIG. 5 is a diagram illustrating a process of generating a learning model according to an embodiment of the present invention.

FIG. 5 is a diagram illustrating a process of generating a learning model according to an embodiment of the present invention.

Referring to FIG. 5, the learning module 183 of the processor 180 selects N data having a hidden Markov model-state entropy greater than a reference entropy from among the learning data.

The hidden Markov model-state entropy may increase as a deviation in the number of phonemes configuring a syllable decreases. In contrast, the hidden Markov model-state entropy may decrease as the deviation in the number of phonemes configuring the syllable increases.

The learning module 183 performs unsupervised learning using the selected N data and prestored seed data (S503).

The unsupervised learning may be a method of learning a learning model such that a pattern is found in training data itself to classify data.

The learning module 183 may acquire an association between the N data and text data matching the prestored seed data using the unsupervised learning.

The prestored seed data may be voice data used if the existing learning model is generated.

The learning module 183 generates a new learning model learned through the unsupervised learning (S505).

The learning module 183 may generate the new learning model in which the association between the N data and the text data matching the prestored seed data is stored.

According to the embodiment of FIG. 5, since voice data having high reliability is used and the unsupervised learning is used, the result of recognizing voice data may be used immediately used for learning, without a manual labeling process.

Manual labeling means that a person directly transcribes (types) text data corresponding to voice data.

FIG. 4 will be described again.

The adaptation module 185 of the processor 180 may generate the adaptive model using the classified adaptive data (S409).

The adaptive data has less reliability than the learning data. The adaptive data is relatively less reliability than the learning data and thus may be voice data reflecting an actual use environment.

The adaptation module 185 may generate an adaptive model with respect to the adaptive data using the generative adversarial network (GNA) described in FIG. 1.

The adaptation module 185 may generate the adaptive model, by modeling a probability distribution of the adaptive data using a machine learning algorithm capable of unsupervised learning, such as a generative adversarial network.

The performance estimation module 187 of the processor 180 evaluates voice recognition performance of the generated learning model and adaptive model (S411).

In one embodiment, the performance estimation module 187 may evaluate voice recognition performance, by measuring the performance evaluation value of a model applied to logging voice data obtained in the actual use environment, in addition to the plurality of data used in step S401.

Here, the performance evaluation value may indicate the degree of the voice recognition obtained if the learning model is applied to the logging voice data. More specifically, the performance evaluation value may indicate the number of successes of voice recognition if the learning model is applied to the logging voice data.

For example, if the number of successes of voice recognition is 90 if the learning model is applied to the same logging voice data 100 times, the performance evaluation value may be 90.

Specifically, the performance estimation module 187 may measure a first performance evaluation value of the obtained recognition result, by applying the learning model to logging data.

In addition, the performance estimation module 187 may measure a second performance evaluation value of the obtained recognition result, by applying the learning model to the same logging data.

The performance estimation module 187 may evaluate a model for providing the larger performance value between the first performance evaluation value and the second performance evaluation value as a model having better performance.

For example, the performance estimation module 187 may evaluate the learning model as a model having better performance, if the first performance evaluation value is greater than the second performance evaluation value.

In contrast, the performance estimation module 187 may evaluate the adaptive model as a model having better performance, if the second performance evaluation value is greater than the first performance evaluation value.

Step S411 will be described with reference to FIG. 6.

Figure 6:
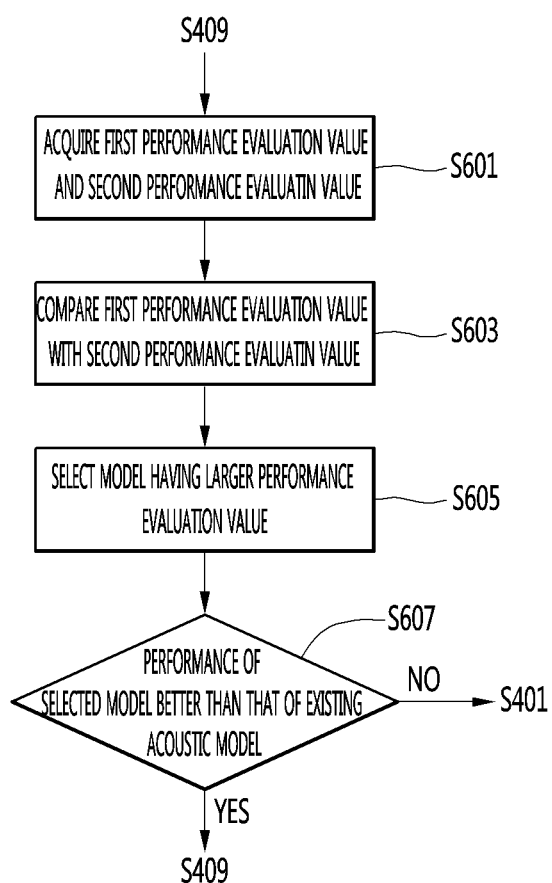
FIG. 6 is a diagram illustrating a process of evaluating performance of a learning model and an adaptive model according to an embodiment of the present invention.

FIG. 6 is a diagram illustrating a process of evaluating performance of a learning model and an adaptive model according to an embodiment of the present invention.

Referring to FIG. 6, the performance estimation module 187 acquires the first performance evaluation value of the learning model and the second performance evaluation value of the adaptive model (S601).

In one embodiment, the performance estimation module 187 may include a first voice recognizer (not shown) including a learning model and a second voice recognizer (not shown) including an adaptive model.

The first voice recognizer may measure the first performance evaluation value indicating the degree of voice recognition with respect to the learning model.

The second voice recognizer may measure the second performance evaluation value indicating the degree of voice recognition with respect to the adaptive model.

The performance estimation module 187 compares the first performance evaluation value with the second performance evaluation value (S603), and selects a model having the larger performance evaluation value between the learning model and the adaptive model as a model for determining whether update is performed (S605).

The performance estimation module 187 determines whether the performance of the selected model is better than that of an existing acoustic model (S607).

In one embodiment, the performance estimation module 187 may determine whether performance is improved, by comparing the performance evaluation value of the selected model with the performance evaluation value of the existing acoustic model.

The performance estimation module 187 may determine that performance is improved, if the performance evaluation value of the selected model is greater than that of the existing acoustic model.

FIG. 4 will be described again.

The performance estimation module 187 of the processor 180 updates the existing model according to the result of evaluating voice recognition performance (S413).

In one embodiment, the performance estimation module 187 may select a model having a larger performance evaluation value from between the learning model and the adaptive model.

The performance estimation module 187 may evaluate performance of the selected mode and the existing acoustic model.

Similarly, the performance estimation module 187 may compare the performance evaluation value of the selected model with that of the existing acoustic model.

The performance estimation module 187 may update the existing acoustic model to the selected model, if the performance evaluation value of the selected model is greater than that of the existing acoustic model.

The performance estimation module 187 may maintain the existing acoustic model without updating, if the performance evaluation value of the selected model is less than that of the existing acoustic model.

Figure 7:
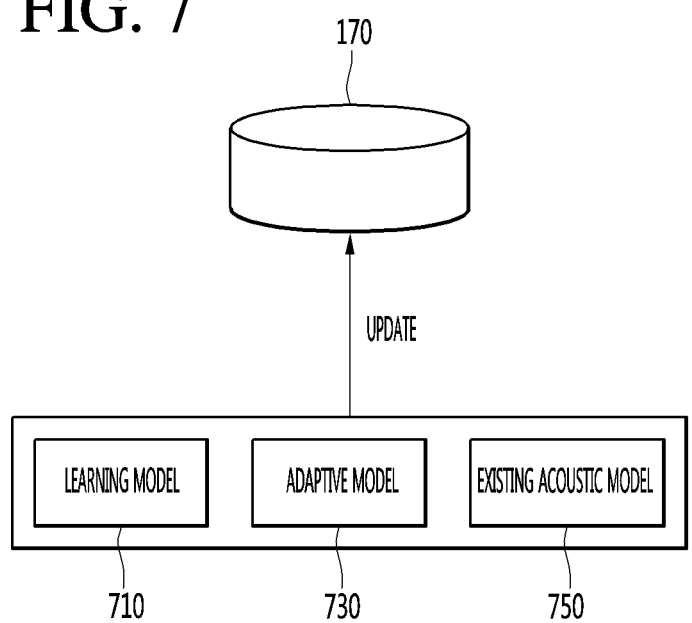
FIG. 7 is a diagram illustrating a process of updating a voice recognition model according to an embodiment of the present invention.

FIG. 7 is a diagram illustrating a process of updating a voice recognition model according to an embodiment of the present invention.

Referring to FIG. 7, the performance estimation module 187 of the processor 180 may evaluate performance of a learning model 710 and an adaptive model 730.

Thereafter, the performance estimation module 187 may evaluate the performance of a model having better performance between the learning model 710 and the adaptive model 730 and the performance of the existing acoustic model 750.

The performance estimation module 187 may update the existing acoustic model 750 to a new model and store the new model in the memory 170, if the performance evaluation value of the model having better performance between the learning model 710 and the adaptive model 730 is greater than that of the existing acoustic model 750.

In FIG. 7, the terminal 100 may transmit the new model to a separate voice recognition server through the wireless communication unit 110.

FIG. 8 is a ladder diagram illustrating a method of operating a voice recognition system according to an embodiment of the present invention.

In particular, FIG. 8 shows a process of performing the steps described in FIG. 4 at the learning apparatus 1000 described in FIG. 1.

The processor 1020 of the learning apparatus 1000 may include the data selection module 181, the learning module 183, the adaptation module 185 and the performance estimation module 187, all of which are shown in FIG. 3.

Referring to FIG. 8, the processor 1020 of the learning apparatus 1000 removes unlearnable data from a plurality of data (S801).

The processor 1020 may measure reliability of remaining learnable data (S803), after removing unlearnable data.

The processor 1020 may classify learnable data into learning data or adaptive data according to the measured reliability (S805).

The processor 1020 may generating a learning model, by performing unsupervised learning with respect to the classified training data (S807).

The processor 1020 may generate an adaptive model using the classified adaptive data (S809).

The processor 1020 may evaluate voice recognition performance of the generated learning model and adaptive model (S811).

The processor 1020 updates the existing model according to the result of evaluating voice recognition performance (S813).

The processor 1020 transmits the updated acoustic mode to the terminal 100 through the wireless communication unit (not shown) (S815).

According to the embodiment of the present invention, it is possible to save a lot of time and cost without manual transcription of voice data.

In addition, it is possible to reduce a learning time by selectively using data.

In addition, it is possible to effectively improve voice recognition in an actual environment using a learning model and an adaptive model.

The present invention may be implemented as code that can be written to a compusuter-readable recording medium and can thus be read by a computer. The computer-readable recording medium may be any type of recording device in which data can be stored in a computer-readable manner. Examples of the computer-readable recording medium include a hard disk drive (HDD), a solid state drive (SSD), a silicon disk drive (SDD), a ROM, a RAM, a CD-ROM, a magnetic tape, a floppy disk, optical data storage, and a carrier wave (e.g., data transmission over the Internet). In addition, the computer may include the first controller 180 of the terminal.

What is claimed is:

1. A terminal comprising:
a memory configured to store learnable data; and
a processor configured to:
measure reliability of the learnable data stored in the memory,
classify the learnable data as either learning data or adaptive data according to the measured reliability;
generate a learning model by performing unsupervised learning with respect to the learning data;
generate an adaptive model using the adaptive data; and
evaluate recognition performance of each of the learning model and the adaptive model.

2. The terminal of claim 1, wherein the processor is further configured to:
classify the learnable data as the learning data if the measured reliability is equal to or greater than a reference reliability; and
classify the learnable data as the adaptive data if the measured reliability is less than the reference reliability.

3. The terminal of claim 2, wherein the processor is further configured to:
select N data having a hidden Markov model-state entropy greater than a reference entropy from among the learning data having the measured reliability equal to or greater than the reference reliability;
perform unsupervised learning using the selected N data and prestored seed data; and
generate the learning model according to a result of performing the unsupervised learning.

4. The terminal of claim 2, wherein the processor is further configured to:

generate the adaptive model using a generative adversarial network with respect to the adaptive data having the measured reliability less than the reference reliability.

5. The terminal of claim 1, wherein the processor is further configured to:
  measure a first performance evaluation value indicating a number of successes of voice recognition, if the learning model is applied to logging voice data;
  measure a second performance evaluation value indicating a number of successes of voice recognition, if the adaptive model is applied to the logging voice data; and
  select a model corresponding to a larger performance evaluation value of the first performance evaluation value and the second performance evaluation value of the learning model and the adaptive model.

6. The terminal of claim 5, wherein the processor is further configured to:
  compare a performance evaluation value of the selected model with that of a prestored acoustic model; and
  update the acoustic model to the selected mode if the performance evaluation value of the selected model is greater than that of the acoustic model.

7. A method of operating a terminal having a memory, the method comprising:
  measuring reliability of learnable data stored in the memory,
  classifying the learnable data as either learning data or adaptive data according to the measured reliability;
  generating a learning model by performing unsupervised learning with respect to the learning data;
  generating an adaptive model using the adaptive data; and
  evaluating recognition performance of each of the learning model and the adaptive model.

8. The method of claim 7, wherein the classifying includes:
  classifying the learnable data as the learning data if the measured reliability is equal to or greater than a reference reliability; and
  classifying classify the learnable data as the adaptive data if the measured reliability is less than the reference reliability.

9. The method of claim 8, wherein the generating of the learning model includes:
  selecting N data having a hidden Markov model-state entropy greater than a reference entropy from among the learning data having the measured reliability equal to or greater than the reference reliability;
  performing unsupervised learning using the selected N data and prestored seed data; and
  generating the learning model according to a result of performing the unsupervised learning.

10. The method of claim 8, wherein the generating of the adaptive model includes generating the adaptive model using a generative adversarial network with respect to the adaptive data having the measured reliability less than the reference reliability.

11. The method of claim 7, wherein the evaluating of the recognition performance includes:
  measuring a first performance evaluation value indicating a number of successes of voice recognition, if the learning model is applied to logging voice data;
  measuring a second performance evaluation value indicating a number of successes of voice recognition, if the adaptive model is applied to the logging voice data; and
  selecting a model corresponding to a larger performance evaluation value of the first performance evaluation value and the second performance evaluation value of the learning model and the adaptive model.

12. The method of claim 11, further comprising:
  comparing a performance evaluation value of the selected model with that of a prestored acoustic model; and
  updating the acoustic model to the selected mode if the performance evaluation value of the selected model is greater than that of the acoustic model.

13. A non-transitory machine-readable medium comprising code, which, when executed by a machine, causes the machine to perform operations, the operations comprising:
  measuring reliability of learnable data stored in memory,
  classifying the learnable data as either learning data or adaptive data according to the measured reliability;
  generating a learning model by performing unsupervised learning with respect to the learning data;
  generating an adaptive model using the adaptive data; and
  evaluating recognition performance of each of the learning model and the adaptive model.

* * * * *